United States Patent [19]

Strong

[11] 4,098,019
[45] Jul. 4, 1978

[54] SOIL PASTEURIZING APPARATUS

[76] Inventor: John D. Strong, 136 Gray St., Amherst, Mass. 01002

[21] Appl. No.: 812,564

[22] Filed: Jul. 5, 1977

[51] Int. Cl.² .......................... A01G 11/00; F24J 3/02
[52] U.S. Cl. ..................................... 47/1 R; 126/270; 47/DIG. 10
[58] Field of Search ........................... 47/1, DIG. 10; 126/270 R

[56] References Cited

U.S. PATENT DOCUMENTS

| 1,996,708 | 4/1935 | Parsons | 47/1 |
| 2,856,505 | 10/1958 | Dillon | 47/1 |
| 3,391,688 | 7/1968 | Dery | 126/270 R |

Primary Examiner—Robert E. Bagwill
Attorney, Agent, or Firm—Kenway & Jenney

[57] ABSTRACT

In the soil pasteurizing apparatus disclosed herein, soil to be treated is placed within elongate canisters which are then inserted in an enclosure in the form of a shallow box having a transparent window constituting one of the broad faces thereof. The canisters are spaced from each other and from the walls of the enclosure. Reflective means are provided for directing, onto the canisters, solar radiation which impinges in regions of the enclosure not actually occupied by the canisters. Thermally-induced circulation around the canisters further facilitates overall heating. The elongate configuration of the canisters permits even the interior portion of a usable volume of soil to be heated to pasteurizing temperatures using only the solar energy available in a convenient time interval, e.g. 3 hours.

9 Claims, 4 Drawing Figures

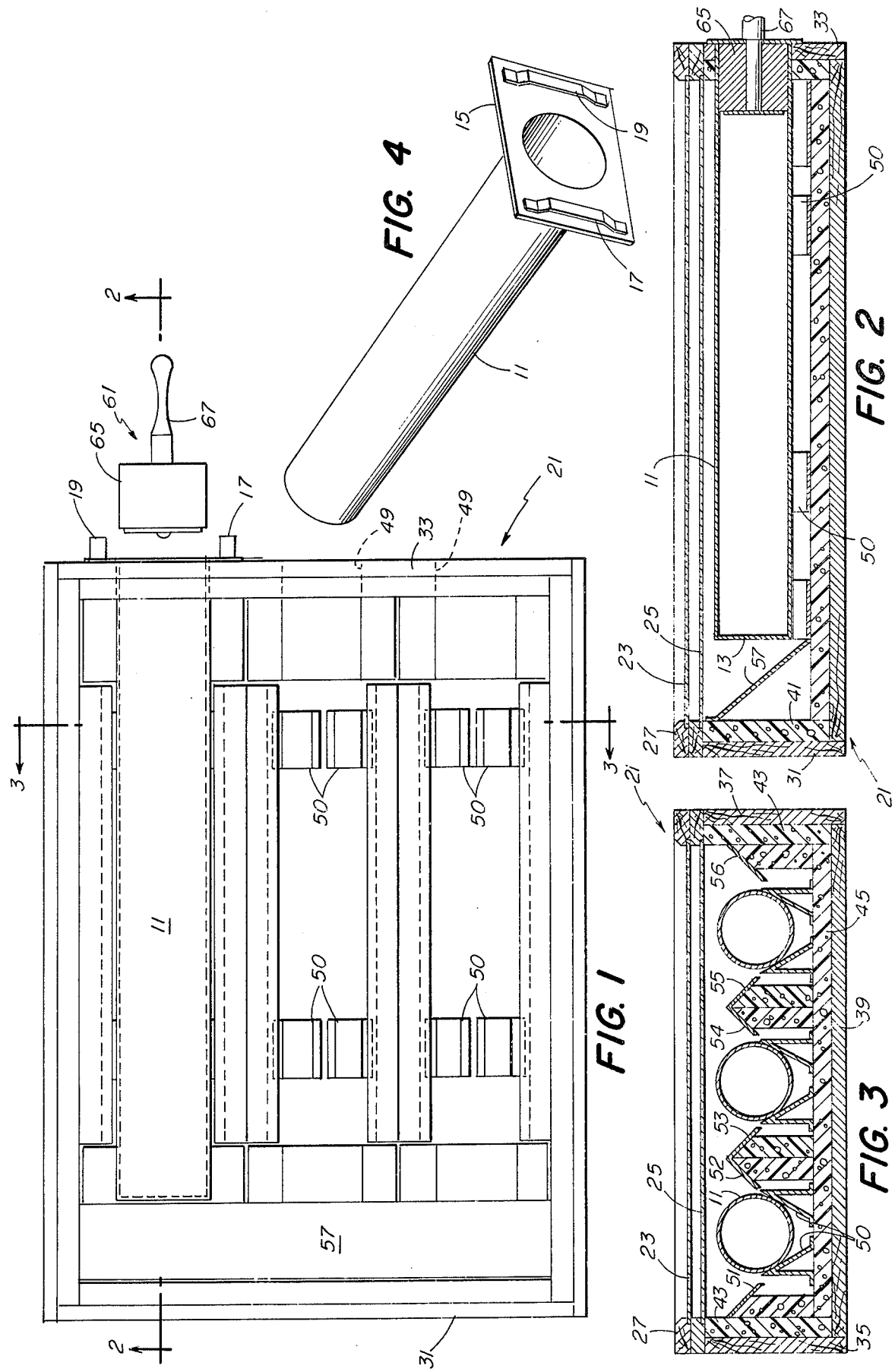

_SOIL PASTEURIZING APPARATUS_

BACKGROUND OF THE INVENTION

This invention relates to a solar soil pasteurizing apparatus and, more particularly, to such apparatus which may be transported to the site where the soil is to be used and which will pasteurize a useful quantity of soil within a reasonable period of time.

While the use of solar energy for many purposes has not yet become feasible, largely due to the high capital costs involved and the sporadic availability of the energy source, the present invention makes use of solar energy for the effective and efficient pasteurizing of soil, an operation which is not efficiently accomplished by other means, particularly any such means readily available to the domestic gardener.

Amateur gardeners will frequently attempt to pasteurize a bulk of soil by heating it in a kitchen oven. This is often futile in that the outer layers may be overheated to a degree which will impair fertility, while the center never reaches a temperature adequate to effect the desired pasteurization unless the heating takes place over a very prolonged period. This flows from the fact that soil is a poor diffuser of heat and is, in fact, a rather good thermal insulator. The amount of energy thus necessary to accomplish such a long-term heating is substantial and, further, the soil must be transported to the source of heat.

Among the several objects of the present invention may be noted the provision of apparatus for pasteurizing soil; the provision of such apparatus which may be utilized at the site where the soil will be used; the provision of such apparatus which will pasteurize soil using solar energy; the provision of such apparatus which will pasteurize a significant quantity of soil in a convenient time interval; and the provision of such apparatus which is of relatively simple and inexpensive construction.

SUMMARY OF THE INVENTION

In the apparatus of the present invention, the heating of a useful quantity of soil to pasteurizing temperatures is accomplished by arraying the soil in a configuration facilitating the penetration of heat, i.e., in elongate canisters, which are then arranged in a solar heating enclosure so as to be heated from all sides.

Briefly, portable soil pasteurizing apparatus according to the present invention involves a plurality of elongate canisters having substantially equal transverse dimensions, the canisters being openable at one end for receiving soil to be pasteurized. These canisters are inserted through one side wall of a housing which is generally in the form of a shallow box having a transparent window constituting one of the broad faces thereof. The housing includes means for supporting the canisters in spaced relation from the wall of the housing thereby permitting air to circulate from the front of the canisters to the back to distribute heat. The housing also includes reflective means for directing, onto the canisters, radiation entering the housing in regions not occupied by the canisters, the exterior of the canisters being blackened so as to be solar energy absorbing. The area of the housing window is preferably about twice the projected area of the portions of the canisters within the housing, and the housing is of a generally insulated construction to minimize heat loss by conduction.

BRIEF DESCRIPTION OF THE DRAWINGS

FIG. 1 is a plan or front-face view of soil pasteurizing apparatus constructed in accordance with the present invention;

FIG. 2 is a sectional view of the soil pasteurizing apparatus taken substantially on the line 2—2 of FIG. 1;

FIG. 3 is a sectional view of the soil sterilizing apparatus taken substantially on the line 3—3 of FIG. 1; and FIG. 4 is a perspective view of a soil canister employed with the apparatus of FIG. 1.

Corresponding reference characters indicate corresponding parts throughout the several views of the drawings.

DESCRIPTION OF THE PREFERRED EMBODIMENT

In order to permit heat to be applied over a large surface and to penetrate throughout the soil mass, the soil to be pasteurized is arrayed in an elongate format in metal canisters 11. In keeping with this function, the canisters 11 are elongate and have a cross-sectional configuration providing substantially equal transverse dimensions, the simplest such configuration being a metal tube of circular cross-section as shown in the drawing. One end of each tube is closed as indicated at 13 while the other end is provided with a flange 15 carrying a pair of handles 17 and 19.

For pasteurizing soil placed in the canisters 11, the canisters themselves are placed in a solar heating enclosure 21, the particular embodiment illustrated having provision for three canisters 11. The enclosure 21 is generally in the form of a shallow box having a transparent window constituting one of the broad faces thereof. As shown in the drawings, the window face comprises a pair of spaced glass lights 23 and 25 supported in a wooden frame 27. The ends 31 and 33, sidewalls 35 and 37, and bottom 39 may be constructed of plywood or other suitable structural material. Preferably, such plywood panels are lined with an insulating material, such as polyurethane foam, as indicated at 41, 43 and 45 in the drawings. Though the plywood panels themselves may be sufficiently insulating in some instances, the added insulation is preferred in order to minimize heat loss by conduction from the interior of the enclosure. The use of double-spaced lights of glass for the window performs a like function. The frame 27, with the glass lights 23 and 25, is preferably constructed so it can be easily removed from the rest of the housing to permit cleaning of the interior reflectors, described hereinafter.

The canisters 11 may be inserted into the enclosure 21 through fitted openings 49 in the end panel 43 and are supported within the enclosure in spaced relation to the inner surfaces thereof by sheet metal vees 50. In one particular embodiment, the canisters 11 were 4 inches in diameter and 34 inches long and the inside dimensions of the box were 23½ by 35½ by 6 inches.

The area of the enclosure window is preferably about twice the projected area of the portions of the canisters 11 within the enclosure. Suitable reflectors are arranged for directing, onto the canisters, incident solar energy which enters the housing in regions not occupied by the canisters themselves. Elongate reflectors 51-56 extending parallel to the canisters are arranged along the sidewalls of the housing and between the adjacent but spaced canisters, while an inclined reflective plate 57 is disposed at the foot of the housing for directing solar radiation at the ends 13 of the canisters and, to a certain extent, to the undersides thereof. A similar, but apertured, reflector may be used at the other ends of the canisters. The height of the reflectors 51-56 may be adjusted with respect to the center lines of the canisters themselves to vary the extent to which the reflected radiation is directed to the sides or underneath the canisters 11. The length of the reflectors 51-56 is held to about 24 inches to permit air circulation as described hereinafter. Other reflectors may be included so that all radiation available through the effective aperture is directed onto the canisters and thus utilized.

While direct solar heating is obviously greater on the facing surfaces of the canisters 11, the spacing of the canisters from the front and back faces of the enclosure forms air channels which facilitate a thermally-driven air circulation which distributes heat from the front of the canisters to their backs. In other words, the air between the front face of each canister and the window will rise while the air between the canisters and the back panel will fall. Since the enclosure is of a generally thermally-insulating construction minimizing heat loss by conduction, the soil within the canister will, in actual practice, tend to be heated from all sides of the cylindrical canister so the core temperature will be raised to the necessary levels in a conveniently short period. In this context, it should be understood that the housing should be essentially airtight so as to prevent the loss of hot air from the space around the canisters.

In addition to holding the soil to be pasteurized in a configuration suitable for efficient heating, the canisters 11 also act as a vapor barrier between the contents of the canisters and the interior of the housing not occupied by the canisters. This barrier is important since it prevents moisture from the soil from fogging the mirrors and window in a way which would interfere with their proper operation. The arrangement of the canisters does allow some moisture vapor to vent outside the housing. It is, however, typically desirable to retain moisture in the soil being pasteurized rather than to dry it out. Accordingly, loose fitting plugs 61 are provided for the open ends of the canister, each plug preferably comprises a fitting cylindrical block 65 of insulating foam, so as to again minimize heat loss by conduction, together with a suitable wood handle 67 for removing the plug.

In operation, therhousing is preferably supported, e.g. by a suitable frame not shown, so that the window faces the sun with the open ends of the canisters being at the upper end of the housing. With the dimensions given in connection with the foregoing description, all portions of a given soil batch will be efficiently pasteurized in a period of less than 3 hours of operation facing a sun above 20° elevation on a clear day. In this context soil is considered to be pasteurized when it has been heated to 150° F. or more for 30 minutes or longer. This exposure is conventionally specified as sufficient to kill fungus and plant parasites such as nematodes and to make weed seed infertile. If desired, a thermometer can be inserted through one of the plugs to check the progress of the heating.

For the dimensions given, each batch has a total volume which is slightly more than a half-bushel. While this volume is not particularly large, it should be noted that the soil can be treated in batches when full sun is available and then accumulated or banked for use at planting time. Likewise, since the apparatus is portable, it may be set up and used at the location where the soil is both initially acquired and then, after sterilization, used for planting. The gardener need only load and unload the apparatus at the beginning and end of a pasteurizing cycle which is of convenient duration. For a 3-hour operating cycle, it is generally sufficient that the orientation of the enclosure be changed only once during the cycle to maintain the orientation of the window sufficiently normal to the sun's rays.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Portable soil pasteurizing apparatus, said apparatus comprising:
    a plurality of elongate canisters having substantially equal transverse dimensions, said canisters being openable at one end for receiving soil to be pasteurized;
    a housing generally in the form of a shallow box having a transparent window constituting one of the broad faces thereof and having also openings in one end wall thereof through which said canisters may be inserted into said box in a spaced, generally parallel array, said canisters constituting a vapor barrier between the contents of the canisters and the interior of the box outside of the canisters;
    said housing including means for supporting said canisters in spaced relation from the walls of the housing thereby permitting air to circulate from the front of the canisters to the back to distribute heat; and
    reflective means for directing, onto the canisters, radiation entering the housing in regions not occupied by the canisters, the exterior surface of the canisters being blackened so as to be solar energy absorbing, the area of said housing window being about twice the projected area of the portions of said canisters within said housing, said housing being of a generally insulating construction to minimize heat loss by conduction.

2. Apparatus as set forth in claim 1 wherein said canisters are cylindrical metal tubes, closed at one end.

3. Apparatus as set forth in claim 2 wherein said tubes are about four inches in diameter.

4. Apparatus as set forth in claim 1 further comprising removable insulating plugs for closing the ends of the canisters through which soil is placed into the canisters.

5. Apparatus as set forth in claim 1 wherein said window comprises a spaced pair of glass lights.

6. Apparatus as set forth in claim 1 wherein the sides and bottom of said housing are lined with insulation.

7. Apparatus as set forth in claim 6 wherein said insulation is a foamed plastic.

8. Portable soil pasteurizing apparatus, said apparatus comprising:
    at least one elongate tubular metal canister, said canister being openable at one end for receiving soil to be pasteurized;
    a housing generally in the form of a shallow box having a doubly glazed transparent window constituting one of the broad faces thereof and having also an opening in one end wall thereof through which said canister may be inserted into said box, said canister constituting a vapor barrier between the contents of the canister and the interior of the box outside of the canisters;

said housing including insulating material lining the sides and bottom thereof and including also means for supporting said canister in spaced relation from the walls of the housing thereby permitting air to circulate from the front of the canister to the back to distribute heat; and reflective means for directing, onto the canister, radiation entering the housing in regions not occupied by the canister, the exterior surface of the canister being blackened so as to be solar energy absorbing.

9. Portable soil pasteurizing apparatus, said apparatus comprising:

a plurality of elongated tubular metal canisters, said canisters being openable at one end for receiving soil to be pasteurized;

a housing generally in the form of a shallow box having a transparent window constituting one of the broad faces thereof and having also openings in one end wall thereof through which said canisters may be inserted into said box in a spaced, generally parallel array, said canisters constituting a vapor barrier between the contents of the canisters and the interior of the box outside of the canisters, said window being doubly glazed with spaced glass lights said housing including foamed plastic insulating material lining the sides and bottom thereof and including also means for supporting said canisters in spaced relation from the walls of the housing thereby permitting air to circulate from the front of the canisters to the back to distribute heat; and reflective means along the sides of said housing and between said canisters for directing, onto the canisters, solar radiation entering the housing in the regions not occupied by the canisters, the exterior surfaces of the canisters being blackened so as to be solar energy absorbing, the area of said housing window being about twice the projected area of the portions of said canisters within said housing.

* * * * *